United States Patent Office 3,597,456
Patented Aug. 3, 1971

3,597,456
METHOD FOR PREPARING STERILE LECITHIN
Charles Riffkin, Highland Park, and Rudolfo Cilento, North Brunswick, N.J., assignors to E. R. Squibb & Sons, Inc., New York, N.Y.
No Drawing. Filed May 20, 1969, Ser. No. 826,258
Int. Cl. A23j 7/00; C07f 9/02
U.S. Cl. 260—403         9 Claims

ABSTRACT OF THE DISCLOSURE

The presence of from 0.1 to 5% by weight of a salt of an oxy acid of sulfur wherein the apparent oxidation state of the sulfur is not greater than $+4$ prevents color degradation during the sterilization of lecithin.

BACKGROUND OF THE INVENTION

The present invention relates to the sterilization of lecithin, and more particularly, to a method of sterilizing lecithin whereby color degradation is prevented.

Lecithin is an organic chemical compound, phospholipid in nature, which is used in pharmaceutical practice as a dispersant and surface active agent. In view of the "natural" character of lecithin, it has for many years been used as a dispersant in sterile aqueous suspensions of procaine penicillin. Modern medical practice dictates that very large doses of procaine pencillin be injected in order to achieve a good therapeutic response. When 50% micronized penicillin solids are formulated into an aqueous suspension, the resultant mixture is so thick that it will not flow out of a syringe. The addition of relatively small quantities of sterile lecithin fluidizes this mixture, and permits the injection of high doses.

Lecithin is commercially available as a light yellow or light tan granular solid, or in various liquid forms. The preparation of sterile lecithin has always been a problem in the pharmaceutical industry, particularly while trying to retain its original light color. Lecithin is susceptible to auto-oxidation and decomposition, resulting in an undesirable darkening of the color. Various methods are used in commercial practice, none of which are entirely satisfactory. Commercial lecithin can be sterilized by dispersing it in water and autoclaving the mixture at about 121° C. and at about 15 lbs. steam pressure, for from about 30 to about 60 minutes. In the normal course of events this procedure will yield sterile lecithin. The product, however, is extremely discolored and dark.

It is, accordingly, an object of the present invention to provide an improved process for sterilizing lecithin while at the same time avoiding color degradation. A further object is to prepare light colored sterile lecithin. These and other objects of the present invention will be apparent from the following description.

SUMMARY OF THE INVENTION

It has now been found that color degradation is avoided by contacting aqueous lecithin under sterilizing conditions with a small amount of a salt of an oxy acid of sulfur wherein the apparent oxidation state of sulfur is not greater than $+4$.

DETAILED DESCRIPTION

Aqueous lecithin is a mixture of lecithin and water. The mixture may be in the form of a dispersion, suspension or emulsion. The process of the present invention is applicable to any mixture of lecithin and water, regardless of the lecithin concentration. A preferred aqueous lecithin mixture consists of one-third lecithin and two-thirds water. Such a mixture is preferred as higher concentrations of lecithin tend to be difficult to handle, while lower concentrations require excessively large vessels and involve heating excessive amounts of water. It is to be understood, however, that the foregoing considerations are primarily economic, not chemical, and it is emphasized that the present invention is applicable to any aqueous mixture of lecithin and water.

The sterilizing conditions comprise elevated temperatures and pressures. The temperatures are suitably above 100° C. and the pressures are at least atmospheric and suitably superatmospheric. The upper limit of the sterilizing conditions is the decomposition point of the lecithin. In practice, there is little or no advantage in temperatures above about 130° C. or pressures above a few atmospheres. The lecithin is generally treated at these elevated temperatures and pressures for upwards of fifteen minutes, typically from about thirty minutes to about sixty minutes.

According to the present invention the sterilizing treatment is carried out in the presence of a small amount of a salt of an oxy acid of sulfur wherein the apparent oxidation state of sulfur is not greater than $+4$. The oxy acids of sulfur wherein the sulfur has an apparent oxidation state not greater than $+4$ are sulfoxylic acid ($H_2SO_2$), dithionous acid ($H_2S_2O_4$), sulfurous acid ($H_2SO_3$), and pyrosulfurous acid ($H_2S_2O_5$). In determining the apparent oxidation state of sulfur in the oxy acid, hydrogen is assigned its normal valence of $+1$ and oxygen its normal valence of $-2$. In this way the apparent oxidation state of sulfur can be computed to be $+2$ in sulfoxylic acid, $+3$ in dithionous acid, and $+4$ in both sulfurous acid and pyrosulfurous acid. By way of contrast, sulfur has an apparent valence of $+6$ in sulfuric acid.

The salts of the oxy acids wherein the apparent oxidation state of sulfur is not greater than $+4$ include inorganic salts and organic salts. Among the inorganic salts are the alkali metal salts and ammonium salts. The organic salts include the formyl derivatives of sulfoxylic acid, that is, organic sulfones, and formyl and acetonyl derivatives of sulfurous acid.

Some examples of inorganic salts are lithium sulfite, sodium sulfite, potassium sulfite, ammonium sulfite, lithium sodium sulfite, lithium potassium sulfite, lithium ammonium sulfite, sodium potassium sulfite, sodium ammonium sulfite, potassium ammonium sulfite, lithium bisulfite, sodium bisulfite, potassium bisulfite, ammonium bisulfite, lithium metabisulfite, sodium metabisulfite, potassium metabisulfite, ammonium metabisulfite, lithium sodium metabisulfite, lithium potassium metabisulfite, lithium ammonium metabisulfite, sodium potassium metabisulfite, sodium ammonium metabisulfite, potassium ammonium metabisulfite, lithium hydrogen metabisulfite, sodium hydrogen metabisulfite, potassium hydrogen metabisulfite, ammonium hydrogen metabisulfite, lithium hydrosulfite, sodium hydrosulfite, potassium hydrosulfite, ammonium hydrosulfite, lithium sodium hydrosulfite, lithium potassium hydrosulfite, lithium ammonium hydrosulfite, sodium potassium hydrosulfite, sodium ammonium hydrosulfite, potassium ammonium hydrosulfite, lithium hydrogen hydrosulfite, sodium hydrogen hydrosulfite, potassium hydrogen hydrosulfite and ammonium hydrogen hydrosulfite.

The organic salts may be, for example, sodium formaldehyde sulfoxylate (formosul), sodium formaldehyde bisulfite, acetone sodium bisulfite, and the corresponding lithium, potassium and ammonium salts.

The quantity of the salt of the oxy acid of sulfur may vary from about 0.1% to about 5% by weight of the lecithin.

The sterile lecithin obtained by subjecting lecithin to a sterilizing treatment in the presence of a salt of an oxy acid of sulfur according to the present invention may be used directly in solution or dispersion such as in the preparation of procaine penicillin aqueous suspension, or the dispersion of sterile lecithin can be frozen and lyophilized so that sterile dry lecithin can be obtained and used for various purposes in the dry state. The quantity of lecithin which can be treated in this manner is limited only by the equipment size.

The following examples illustrate the present invention without, however, limiting the same thereto.

EXAMPLE 1

500 g. of lecithin and 1 l. of water in which 10 g. of sodium formaldehyde sulfoxylate had been predissolved were added to a 4 l. Pyrex bottle. The bottle was sealed and autoclaved at 121° for one hour. It was then removed from the autoclave and the dispersion of lecithin allowed to cool. The lecithin dispersion was very light in color and acceptable for the preparation of aqueous suspensions of procaine penicillin. On testing for sterility, it was found to be sterile. Aqueous suspensions of procaine penicillin made from this lecithin were tested for muscle irritation and toxicity. There was no significant difference between these preparations and controls.

EXAMPLE 2

The foregoing procedure was repeated except that no sodium formaldehyde sulfoxylate was present. The resulting lecithin dispersion was sterile but much darker in color and unacceptable for the preparation of aqueous suspensions of procaine penicillin.

EXAMPLE 3

500 g. of lecithin were placed in a 4 l. bottle followed by the addition of 1 l. of chilled pyrogen-free water in which 10 g. of sodium bisulfite had been previously dissolved. The resulting mixture was allowed to stand at room temperature for 30 minutes in order to "wet" the lecithin. The bottle was then autoclaved for 30 minutes at 121° C. and allowed to cool. The resulting lecithin dispersion was similar in appearance to that of Example 1.

EXAMPLE 4

0.3 g. of sodium formaldehyde sulfoxylate was dissolved in 600 ml. of water and 1.0 g. of preservative (methyl paraben) then added, followed by 10 g. of sodium citrate. Finally 23 g. of lecithin were added and dispersed by stirring to yield a homogeneous white dispersion which was transferred to a 2 liter bottle and autoclaved at 121° C. for 30 minutes. The resulting sterile dispersion was still white and remained white when 500 g. of sterile procaine penicillin G were aseptically added.

EXAMPLE 5

The procedure of Example 1 was repeated except that when the bottle was removed from the autoclave it was allowed to cool somewhat, but while still warm, was poured into a sterile stainless steel tray, covered and frozen. The tray was subsequently freeze-dried at a vacuum of 50 microns of mercury to yield a porous sterile mass which had a very light acceptable color.

EXAMPLE 6

The lecithin dispersion of Example 3 was poured into trays and freeze-dried as in Example 5 to yield a porous sterile mass similar in appearance to that of Example 5.

What is claimed is:

1. A process for preparing sterile lecithin wherein aqueous lecithin is contacted under sterilizing conditions with a salt of an oxy acid of sulfur wherein the apparent oxidation state of sulfur is not greater than +4, the amount of the reducing agent being effective to prevent discoloration of the lecithin.

2. A process according to claim 1 wherein the salt of the oxy acid of sulfur is present in an amount of from about 0.1% to about 5% by weight of the lecithin.

3. A process according to claim 1 wherein the oxy acid of sulfur is sulfoxylic acid, dithionous acid, sulfurous acid or pyrosulfurous acid.

4. A process according to claim 3 wherein the cation of the salt of the oxy acid of sulfur is an alkali metal or ammonium salt.

5. A process according to claim 3 wherein the anion of the salt of the oxy acid of sulfur is a sulfite, bisulfite, metabisulfite or hydrosulfite.

6. A process according to claim 3 wherein the salt of the oxy acid of sulfur is an organic salt.

7. A process according to claim 6 wherein the organic salt is a sulfoxylate, a formyl derivative of sulfurous acid or an acetonyl derivative of sulfurous acid.

8. A composition comprising a sterile aqueous dispersion of lecithin and from about 0.1% to about 5% by weight of the lecithin of a salt of an oxy acid of sulfur wherein the apparent oxidation state of the sulfur is not greater than +4.

9. A composition comprising sterile dry lecithin and from about 0.1% to about 5% by weight of the lecithin of a salt of an oxy acid of sulfur wherein the apparent oxidation state of the sulfur is not greater than +4.

References Cited
UNITED STATES PATENTS

| | | | |
|---|---|---|---|
| 2,986,516 | 5/1961 | Reddie | 260—403 |
| 3,359,201 | 12/1967 | Eichberg | 260—403 |

ELBERT L. ROBERTS, Primary Examiner